(12) United States Patent
Higgins (10) Patent No.: US 9,851,048 B2
(45) Date of Patent: Dec. 26, 2017

(54) LINER RETENTION SYSTEM FOR AN AERIAL DEVICE

(71) Applicant: Altec Industries, Inc., Birmingham, AL (US)

(72) Inventor: Daniel J. Higgins, Raleigh, NC (US)

(73) Assignee: Altec Industries, Inc., Birmingham, AL (US)

( * ) Notice: Subject to any disclaimer, the term of this patent is extended or adjusted under 35 U.S.C. 154(b) by 151 days.

(21) Appl. No.: 14/670,774

(22) Filed: Mar. 27, 2015

(65) Prior Publication Data

US 2016/0280525 A1  Sep. 29, 2016

(51) Int. Cl.
*F16M 13/02* (2006.01)
*B66F 11/04* (2006.01)
*B66F 17/00* (2006.01)

(52) U.S. Cl.
CPC .......... *F16M 13/02* (2013.01); *B66F 11/046* (2013.01); *B66F 17/006* (2013.01)

(58) Field of Classification Search
CPC .......... E04G 5/08; B65D 11/00; F16M 13/02; B66F 11/046; B66F 17/006; F16B 37/122
USPC .......................................................... 411/84
See application file for complete search history.

(56) References Cited

U.S. PATENT DOCUMENTS

| | | | | |
|---|---|---|---|---|
| 952,602 | A * | 3/1910 | Candee | E03D 11/16 285/346 |
| 2,781,073 | A * | 2/1957 | Trafton | F16B 37/041 411/107 |
| 3,404,751 | A * | 10/1968 | Nosworthy | B66F 11/044 182/150 |
| 3,414,079 | A * | 12/1968 | Wacht | B66F 11/044 182/222 |
| 3,440,707 | A * | 4/1969 | Warren | B23P 6/04 138/99 |
| 3,489,243 | A | 1/1970 | Prescott et al. | |
| 3,605,941 | A | 9/1971 | Edwards | |
| 3,642,096 | A * | 2/1972 | Valentine | B66F 11/044 182/2.11 |
| 3,695,390 | A | 10/1972 | Leigh | |

(Continued)

OTHER PUBLICATIONS

Definition of 'Recess' in Action The American Heritage® Dictionary of the English Language, Fourth Edition Copyright © 2000 by Houghton Mifflin Company. Updated in 2009. Published by Houghton Mifflin Company. All rights reserved.

(Continued)

*Primary Examiner* — Katherine W Mitchell
*Assistant Examiner* — Shiref M Mekhaeil
(74) *Attorney, Agent, or Firm* — Erise IP, P.A.

(57) ABSTRACT

Embodiments of the invention are directed to a utility platform assembly a having a utility platform, an insulative liner, and a liner retention system. The insulative liner presents a complementary shape to, and is disposed in, the utility platform. The insulative liner is secured in place and protected from damage by the liner retention system. The liner retention system is disposed atop and through the liner near the top edge or edges of the insulative liner. The edge or edges of the insulative liner are therefore disposed between the liner retention system and the lip of the sidewall of the utility platform. The liner retention system generally comprises at least one retaining bar with an associated plurality of fastener receptors and fasteners.

10 Claims, 8 Drawing Sheets

(56) References Cited

U.S. PATENT DOCUMENTS

| | | | | |
|---|---|---|---|---|
| 3,917,026 | A | | 11/1975 | Hedges |
| 4,033,243 | A | * | 7/1977 | Kirrish .................. F16B 37/145 411/338 |
| 4,078,697 | A | * | 3/1978 | Schlosberg .......... B01J 19/0073 220/200 |
| 4,161,689 | A | * | 7/1979 | Schlosberg .......... G01N 27/205 324/557 |
| 4,254,846 | A | * | 3/1981 | Soave .................... B65D 25/18 182/2.4 |
| 4,490,083 | A | * | 12/1984 | Rebish ...................... F16B 5/02 411/338 |
| 4,554,995 | A | | 11/1985 | Schlack |
| 4,756,445 | A | * | 7/1988 | Agee, Sr. .................. B65F 1/08 220/23.89 |
| 4,762,451 | A | * | 8/1988 | Collins .................... B60R 11/00 411/177 |
| 4,763,758 | A | | 8/1988 | Moody |
| 4,883,145 | A | | 11/1989 | Deltatto |
| 5,419,665 | A | * | 5/1995 | Adams ................. H01R 13/748 264/328.18 |
| 5,421,036 | A | * | 6/1995 | Stevens .................... E03D 11/16 285/60 |
| 5,611,410 | A | * | 3/1997 | Baillargeon .......... B66F 11/044 182/129 |
| 5,676,510 | A | * | 10/1997 | Fischer .................. B60J 5/0431 411/104 |
| 6,330,931 | B1 | | 12/2001 | Baillargeon et al. |
| 6,443,495 | B1 | * | 9/2002 | Harmeling .............. E03B 11/16 285/3 |
| 6,470,999 | B1 | | 10/2002 | Schanzle |
| 7,182,173 | B2 | | 2/2007 | Bailey |
| 7,241,094 | B1 | * | 7/2007 | Potts ..................... F16B 33/002 411/340 |
| 7,353,817 | B2 | | 4/2008 | Kobel |
| 7,416,053 | B2 | | 8/2008 | Chard et al. |
| 7,721,848 | B1 | * | 5/2010 | Jackson ................ B66F 11/046 182/112 |
| 7,806,231 | B1 | * | 10/2010 | Jackson ................ B66F 11/044 182/112 |
| 7,980,359 | B2 | | 7/2011 | Chard et al. |
| 8,210,785 | B1 | * | 7/2012 | Gager .................... E03D 11/16 411/338 |
| 8,490,746 | B2 | | 7/2013 | Cummings |
| 8,708,177 | B2 | | 4/2014 | Roberts |
| 8,899,380 | B2 | | 12/2014 | Chard |
| 8,899,867 | B2 | * | 12/2014 | Tatomir .................... A42B 3/20 403/168 |
| 9,149,670 | B1 | * | 10/2015 | Walker ............... A62B 35/0068 |
| 9,273,710 | B1 | * | 3/2016 | Chang .................... F16M 13/02 |
| 9,458,952 | B2 | * | 10/2016 | Zhang .................. F16M 13/027 |
| 2001/0022924 | A1 | * | 9/2001 | Wieser .................. F16B 37/122 411/60.1 |
| 2002/0144862 | A1 | | 10/2002 | Engvall et al. |
| 2002/0170783 | A1 | | 11/2002 | Goode |
| 2004/0055817 | A1 | | 3/2004 | Chard et al. |
| 2004/0262079 | A1 | | 12/2004 | Bailey |
| 2006/0175127 | A1 | * | 8/2006 | Higgins ................ B66F 11/044 182/2.1 |
| 2008/0061195 | A1 | * | 3/2008 | Carnevali ............. F16M 11/14 248/125.8 |
| 2008/0308350 | A1 | | 12/2008 | Chard et al. |
| 2009/0101435 | A1 | * | 4/2009 | Higgins ................ B66F 11/044 182/2.1 |
| 2010/0193286 | A1 | | 8/2010 | Higgins et al. |
| 2013/0256024 | A1 | * | 10/2013 | Roberts .................. H01B 17/00 174/5 SB |
| 2014/0138183 | A1 | * | 5/2014 | Chard ................... B66F 17/006 182/46 |
| 2014/0165369 | A1 | * | 6/2014 | Chan ..................... F16B 33/004 29/525.11 |
| 2015/0151504 | A1 | * | 6/2015 | Yang ...................... B32B 3/266 428/99 |
| 2015/0307231 | A1 | * | 10/2015 | Diaz ..................... B65D 21/086 220/614 |
| 2016/0008974 | A1 | * | 1/2016 | Blake ...................... B25H 3/06 206/373 |
| 2016/0009361 | A1 | * | 1/2016 | Roborel De Climens ................... B64C 1/18 244/120 |
| 2016/0160524 | A1 | * | 6/2016 | Malins ..................... A01K 3/00 248/217.4 |
| 2016/0368738 | A1 | * | 12/2016 | Minke ................ A62B 35/0068 |
| 2017/0067513 | A1 | * | 3/2017 | Marks ....................... F16D 3/78 |

OTHER PUBLICATIONS

File History of U.S. Appl. No. 13/682,247, filed Nov. 20, 2012, now U.S. Pat. No. 8,899,380, issued Dec. 2, 2014, entitled System for Restraining a Worker at a Utility Platform of an Aerial Device; Applicant: Altec Industries, Inc.

\* cited by examiner

LINER RETENTION SYSTEM FOR AN AERIAL DEVICE

BACKGROUND

1. Field

Embodiments of the invention relate to aerial devices and utility platforms. More specifically, embodiments of the invention relate to a liner retention system for securing an insulative liner into a utility platform.

2. Related Art

Utility workers utilize an aerial device to reach inaccessible locations. The aerial device generally includes a boom assembly with a utility platform connected to a distal end of the boom. One or more utility workers stand in the utility platform. Utility workers typically use an aerial device to access overhead electric power lines and electric power components for installation, repair, or maintenance. The utility platforms utilized by electric utility workers are highly insulated so as to prevent the discharge of electricity through the utility truck, and especially through the utility worker.

Insulative liners disposed in the utility platform provide good safety features for utility workers, but retaining the liners in the utility platform can be problematic. Additionally, due to harsh working conditions and repeated contact with metal tools and replacement parts, insulative liners are prone to damage. The damage to insulative liners is especially prevalent along their edges. Accordingly, there is a need for protecting the relatively expensive insulative liners from damage. Moreover, due to their insulated nature, utility platforms of the prior art use non-conductive bolts to traverse openings in the insulative liner and the utility platform. These non-conductive bolts are prone to failure due to the stresses imparted on them, especially at the head. There is currently no way to achieve insulative properties while retaining the strength to withstand stress.

SUMMARY

Embodiments of the invention solve the above-mentioned problems by providing a liner retention system for securely, but removably, attaching the insulative liner to a utility platform. The liner retention system also serves to protect the insulative liner from damage. The liner retention system protects the non-conductive bolts from damage by placing the non-conductive bolts within fastener receptors and protrusions in the retaining bar. Components of the liner retention system are also easily and inexpensively replaced upon wear or damage. The liner retention system therefore provides increased usability and increased durability of the insulative liner. This ensures the continued safety of the utility workers at a lower cost for the owner.

A first embodiment of the invention is directed to a utility platform assembly comprising a utility platform, an insulative liner, and a liner retention system. The insulative liner presents a complementary shape to, and is disposed in, the utility platform. The insulative liner is secured in place and protected from damage by the liner retention system. The liner retention system is disposed atop and through the liner near the top edge or edges of the insulative liner. The edge or edges of the insulative liner are therefore disposed between the liner retention system and a bucket lip of a bucket sidewall of the utility platform.

A second embodiment of the invention is directed to the liner retention system. The liner retention system generally comprises at least one retaining bar, each having an associated plurality of fastener receptors and an associated plurality of fasteners. The retaining bar is emplaced over the bucket lip of a bucket sidewall of the utility platform and compresses the edges of the insulative liner. The retaining bar is held in place by the fastener receptors and fasteners, which traverse an opening in the insulative liner and a corresponding opening in the bucket lip of the utility platform.

A third embodiment of the invention is a method of securing an insulative liner into a utility platform. The method generally comprises the following steps: placing the retaining bar atop the bucket lip of the bucket sidewall of the utility platform, such that at least a portion of the edge of the liner is disposed between the retaining bar and the bucket lip; aligning a set of fastener receptors secured to the retaining bar with a set of openings in the utility platform and the insulative liner; placing the set of fastener receptors through the set of openings; and securing a set of fasteners to set of fastener receptors, such that the retaining bar is secured to the insulative liner and the bucket lip of the utility platforms.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Figure 1:
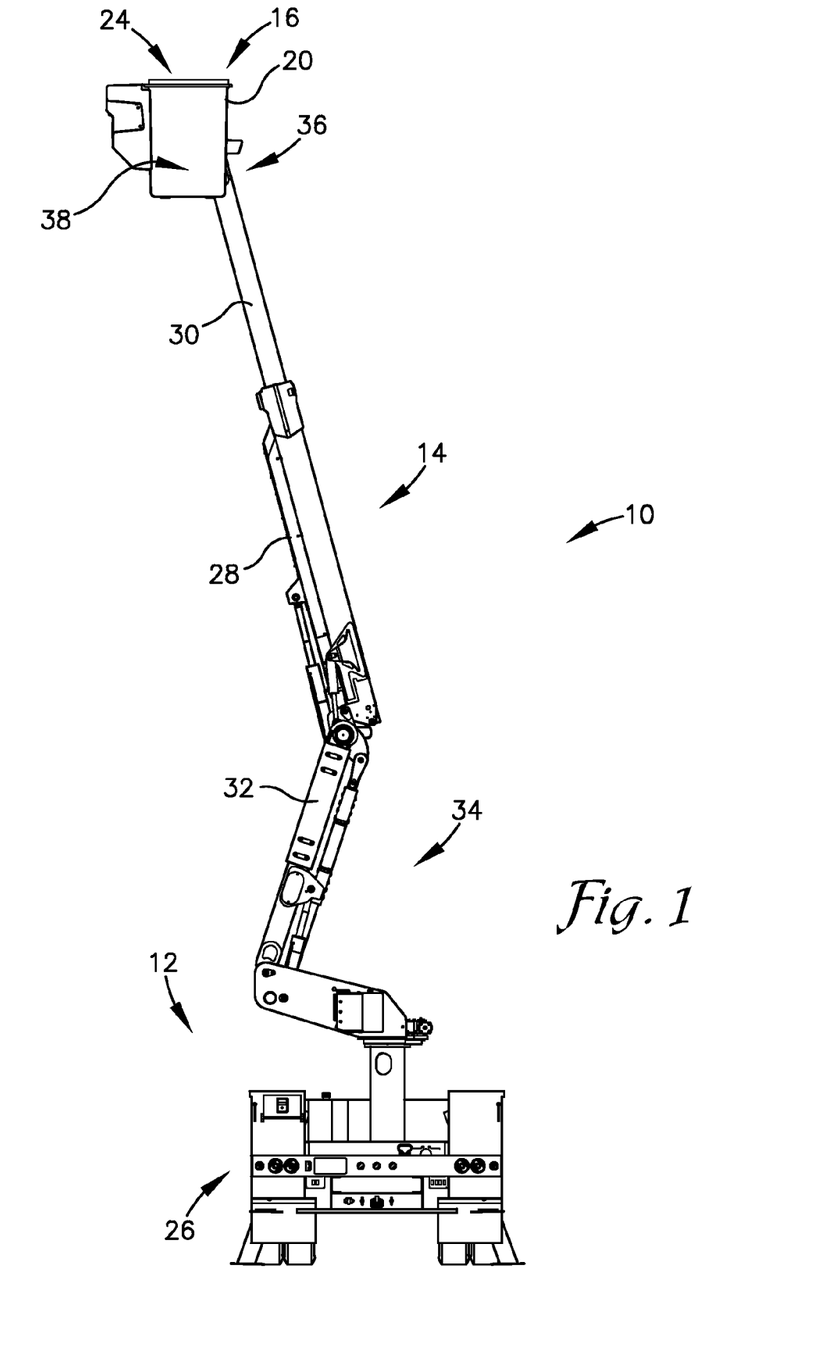
FIG. 1 is an environmental view of an aerial device with a boom assembly and a utility platform assembly.

An aerial device 10, constructed in accordance with various embodiments of the invention, is shown in FIG. 1. The aerial device 10 generally comprises a base 12 with a boom assembly 14 rotatably mounted thereto. A utility platform assembly 16 is disposed on the boom assembly 14 to provide an aerial platform for the accomplishment of a task by a utility worker 18. The utility platform assembly 16 broadly comprises a utility platform 20, an insulative liner 22, and a liner retention system 24. The insulative liner 22 is disposed within the utility platform 20 to provide additional insulative properties. The liner retention system 24 is installed on at least a portion of the insulative liner 22 to secure the insulative liner 22 to the utility platform 20 and protect the insulative liner 22 from damage.

The base 12 of the aerial device 10 is a selectively stabilized platform. In embodiments of the invention, the base 12 is a utility truck 26 (as illustrated in FIG. 1), a crane base, an oilrig, an earth-working machine, or a fixed structure. The base 12 provides stability and a counterweight to a load being supported by the boom assembly 14.

The boom assembly 14 broadly comprises an outer boom section 28 and at least one inner boom section 30. As illustrated in FIG. 1, some embodiments of the boom assembly 14 may further comprise at least one pivoting boom section 32. The boom assembly 14 presents a proximal end 34 and a distal end 36. The proximal end 34 is rotatably and/or pivotably secured to a portion of the base 12. The distal end 36 is secured to the utility platform assembly 16. The at least one inner boom section 30 is at least in part disposed within the outer boom section 28. The at least one inner boom section 30 telescopes to extend or retract into the outer boom section 28. The pivoting boom section 32 does not telescope out of any other boom section. Instead the pivoting boom section 32 rotates about the base 12, and the first boom section pivots and/or rotates relative to the pivoting boom section 32. The use of the pivoting boom section 32 allows the utility platform assembly 16 to reach certain areas and avoid obstacles in the working environment.

Figure 2:
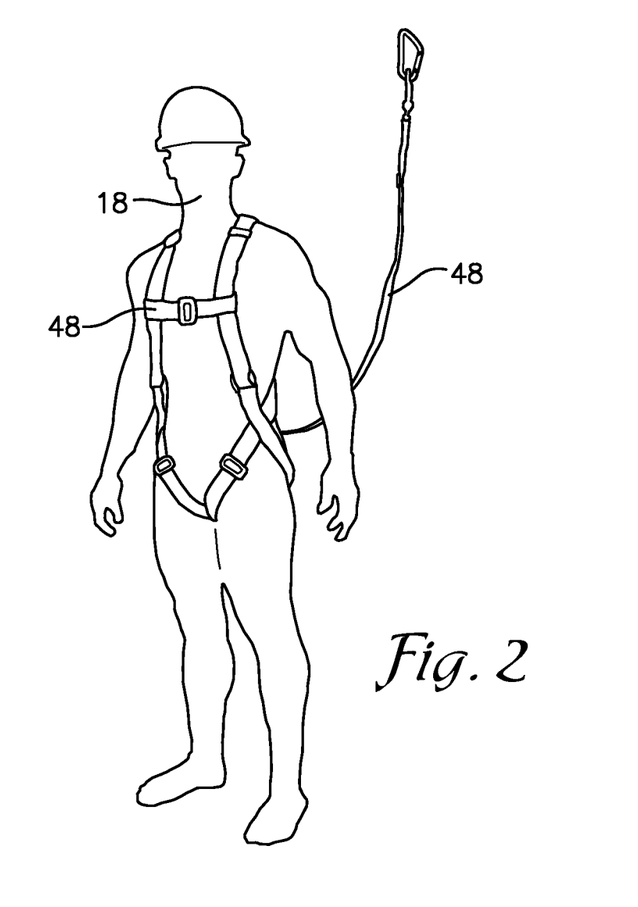
FIG. 2 is a perspective view of a utility worker with a lanyard.
Figure 5:
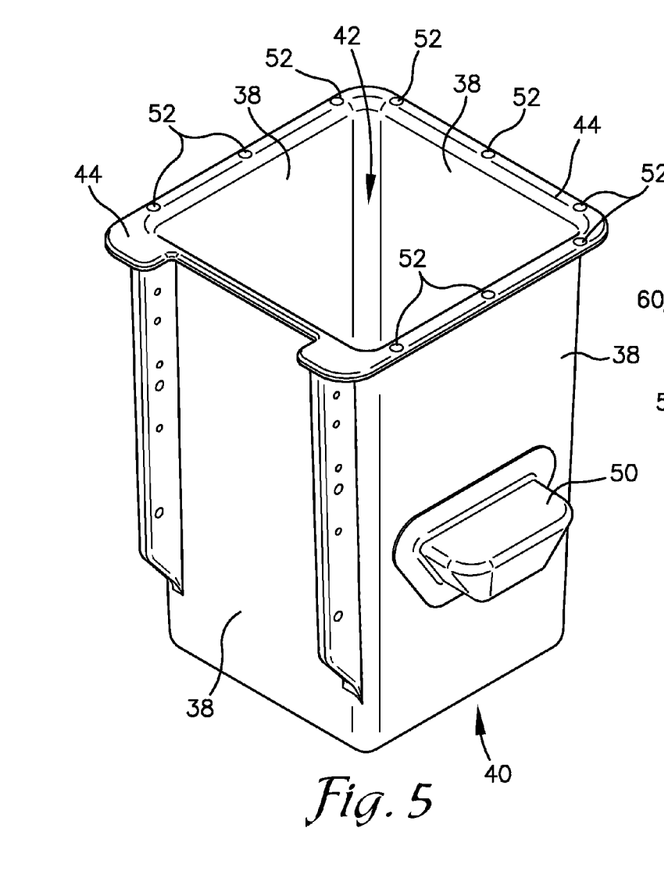
FIG. 5 is a perspective view of a utility platform of the utility platform assembly shown without an insulative liner disposed therein.

The utility platform 20 provides an elevated surface from which at least one utility worker 18 can perform a task. As illustrated in FIG. 5, embodiments of the utility platform 20 comprise four bucket sidewalls 38 and a bucket floor 40 that collectively form a cavity 42. The utility platform 20 may also present a bucket lip 44 along a top portion of at least one bucket sidewall 38. The utility platform 20 may also comprise at least one lanyard anchor 46 for a lanyard 48 worn by the utility worker 18 (as illustrated in FIG. 2). The utility platform 20 may further comprise a step 50 and/or a door (not illustrated) in at least one of the bucket sidewalls 38 to allow for ingress and egress of the utility worker 18. The utility platform 20 may also comprise a handrail (not illustrated).

The four bucket sidewalls 38 and the bucket floor 40 of the utility platform 20 form the cavity 42. The four bucket sidewalls 38 may be unitary, i.e. formed of a single monolithic structure, or they may be coupled together. The transition between successive bucket sidewalls 38, and/or between the bucket sidewalls 38 and the bucket floor 40, may be rounded or arcuate.

In some embodiments, the utility platform 20 presents a horizontal cross-section that is substantially rectangular. Thus, two of the opposing bucket sidewalls 38 may have a greater width than the other two opposing bucket sidewalls 38. In other embodiments, such as illustrated in FIG. 5, the utility platform 20 presents a horizontal cross-section that is substantially square. Although the dimensions of the utility platform 20 may vary widely, an exemplary small one-worker platform has a horizontal cross-section of approximately 24 inches square (or 576 square inches). A large one-worker platform (also known as a "man-and-a-half" platform) is approximately 24 inches by approximately 30 inches (or 720 square inches). An exemplary platform for two utility workers 18 has a horizontal cross-section of approximately 24 inches by approximately 40 inches (or 1,152 square inches). Each of the exemplary platforms has a height of approximately 42 inches. Other embodiments of the utility platform 20 may be other shapes about the horizontal cross-section, such as an ellipse, a circle, a D-shape, a triangle, a trapezoid, a rhombus, or other quadrilateral.

Embodiments of the utility platform 20 present the bucket lip 44 at a top edge of at least one bucket sidewall 38, as illustrated in FIG. 5. The bucket lip 44 of the utility platform 20 provides stability and strength to the bucket sidewalls 38 of the utility platform 20. The bucket lip 44 extends laterally, i.e., perpendicular to the bucket sidewall 38. The bucket lip 44 presents a width and a thickness. In embodiments of the invention, the bucket lip 44 is continuous around all the bucket sidewalls 38. The bucket lip 44 of the utility platform 20 may also present a plurality of openings 52 for the receipt of the retaining bar, as discussed below.

Figure 4:
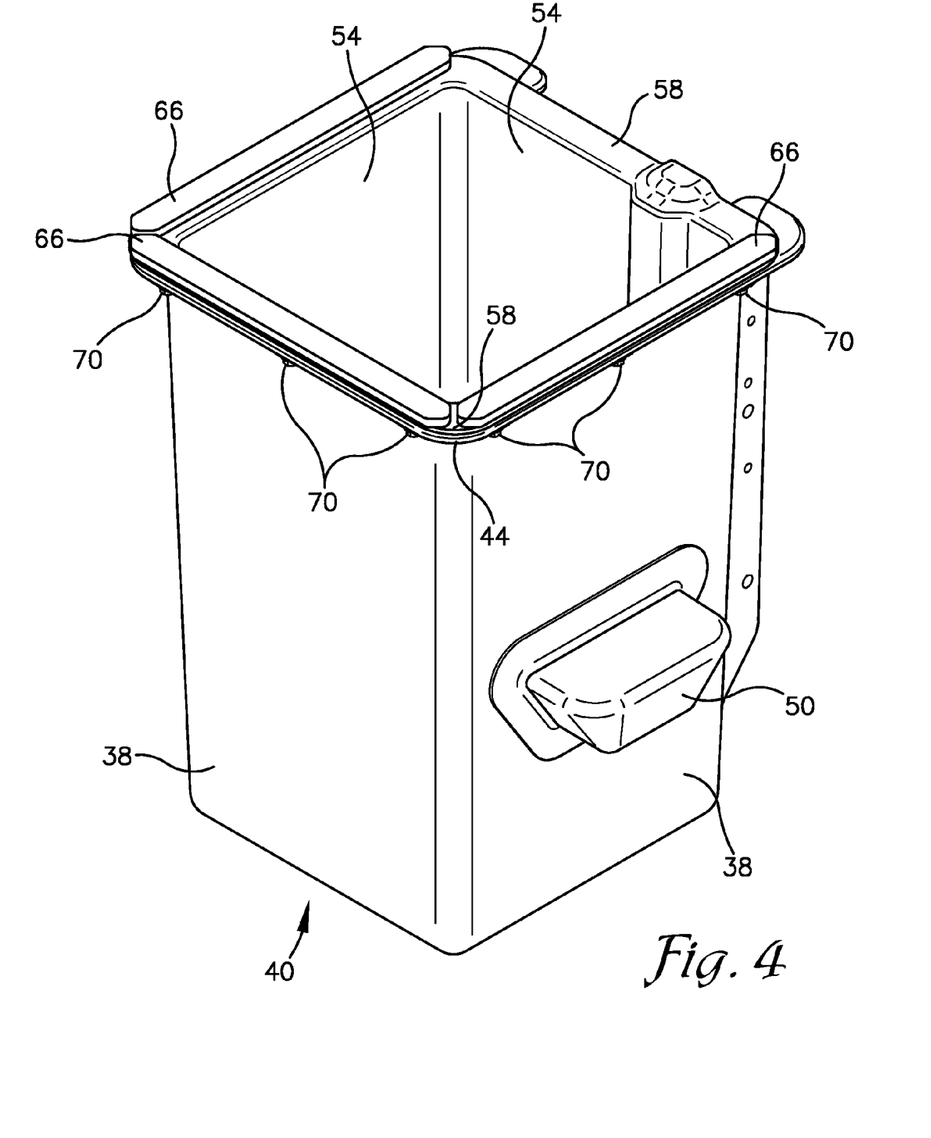
FIG. 4 is a perspective view of the utility platform assembly of FIG. 3, shown without a set of upper controls.
Figure 6:
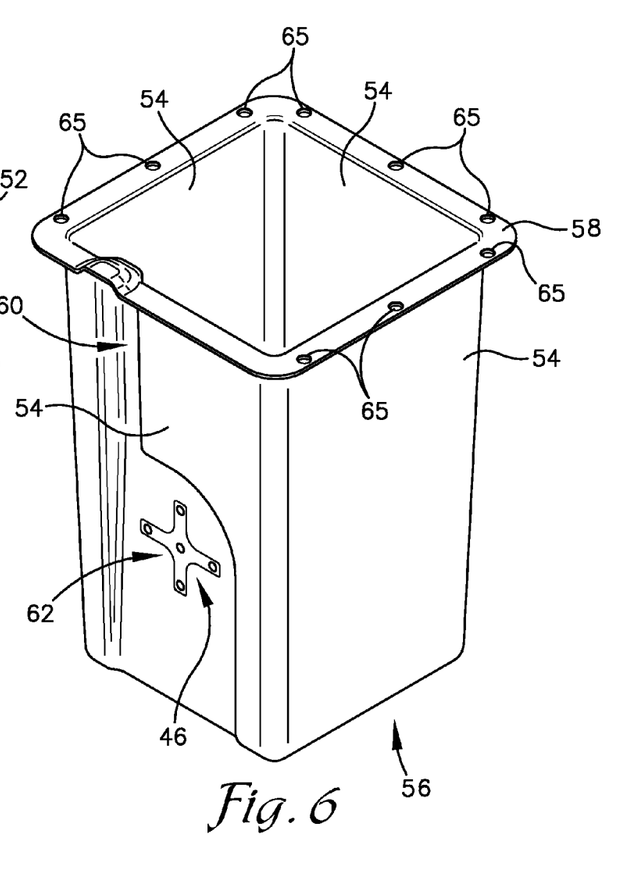
FIG. 6 is a perspective view of an embodiment of the insulative liner.

As illustrated in FIGS. 4-6, the insulative liner 22 generally presents a shape that is complementary to the shape presented by the cavity 42 of the utility platform 20. Embodiments of the insulative liner 22 comprise four liner sidewalls 54 and a liner floor 56. Some embodiments of the insulative liner 22 further comprise a liner lip 58, at least one lanyard anchor 46, and a platform strap channel 60. The four liner sidewalls 54 may be coupled to one another along opposing vertical edges to form a liner body having the same aspect ratio (rectangle, square, or other shape) as the utility platform 20 in which the insulative liner 22 will be placed.

In embodiments, the liner sidewalls 54 and/or liner floor 56 may be formed as a unitary or monolithic structure. Generally, an outer surface of the liner floor 56 and the four liner sidewalls 54 has the same or slightly smaller dimensions as an inner surface of the bucket floor 40 and the bucket sidewalls 38.

In embodiments of the invention the utility platform presents one of the above-discussed shapes about the horizontal cross-section. It should therefore be appreciated that the insulative lining may present a complementary shape and may have more or less than four liner sidewalls 54. It should also be appreciated that in embodiments of the invention, the bucket sidewalls 38 are parallel to and of a substantially similar shape to the liner sidewalls 54. Therefore, the terms "bucket sidewalls" and "liner sidewalls" may be used interchangeably in this application to mean either or both of the sidewalls 38, 54. Similarly, the terms "bucket lip" and "liner lip" may be used interchangeably in this application to mean either or both of the lips 44, 58.

Embodiments of the insulative liner 22 are formed of polyethylene. Other embodiments of the insulative liner 22 are formed of a polyurethane or other polymer. The insulative liner 22 provides insulative properties to the non-conductive utility platform 20. The insulative liner 22 therefore increases the safety and the comfort of the utility worker 18.

Figure 3:
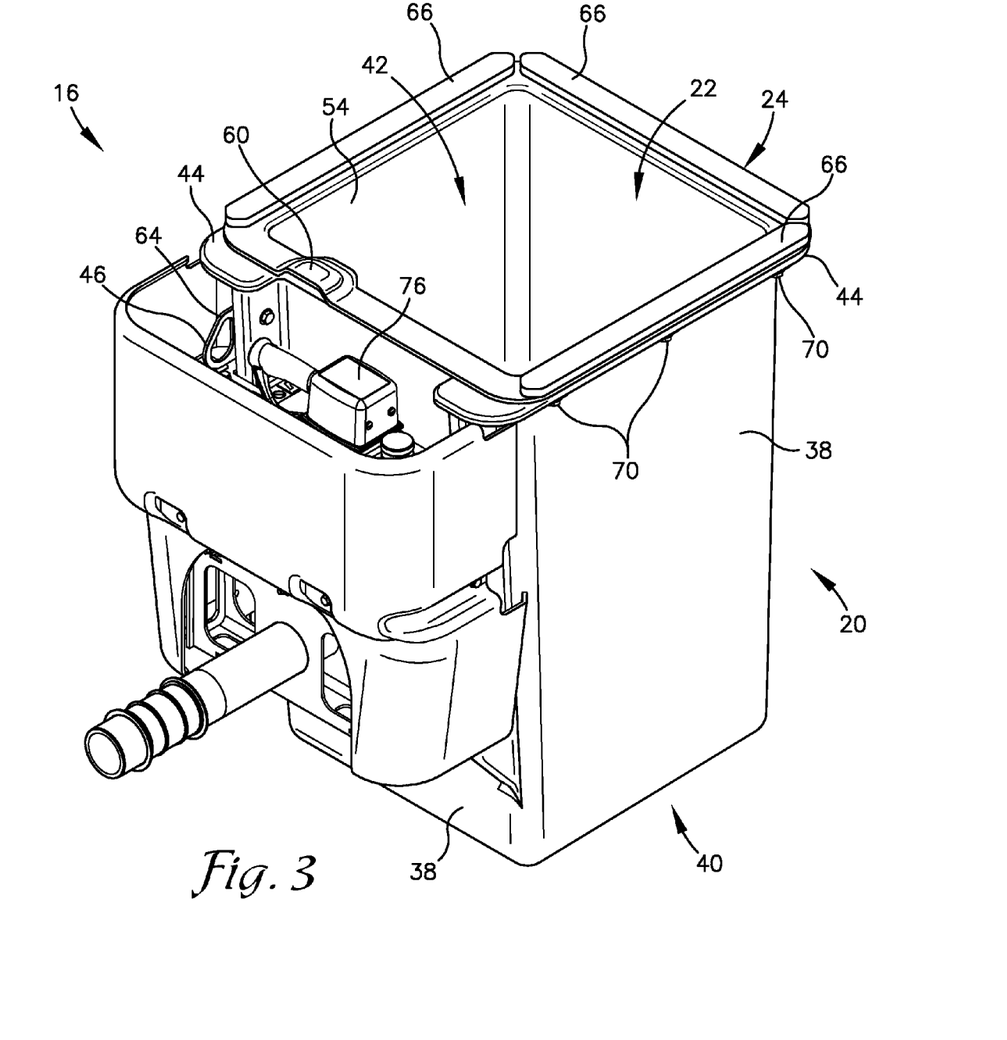
FIG. 3 is a perspective view of the utility platform assembly.

As illustrated in FIGS. 3 and 6, embodiments of the utility platform assembly 16 present an interior anchor 62 and an exterior anchor 64, each being one of said lanyard anchors 46. Utility workers 18 attach their lanyard 48 to the lanyard anchors 46 so as to prevent a fall. The utility worker 18 and the lanyard 48 are illustrated in FIG. 2. The interior anchor 62 prevents the utility worker 18 from being ejected from the utility platform 20 upon a sudden movement or impact. The interior anchor 62 may be formed of a metal that is isolated and insulated so as to prevent electrical discharge. Embodiments of the interior anchor 62 are disposed on a fixture separate from the insulative liner 22 and the utility platform 20 that is secured to the utility platform 20, through the insulative liner 22. The fixture may also assist in retaining the insulative liner 22. In other embodiments, not illustrated, the interior anchor 62 is disposed on the utility platform 20 and traverses an opening (not illustrated) in the insulative liner 22 so as to be accessed by a utility worker 18 in the utility platform 20.

The exterior anchor 64 provides a secondary safety device for preventing the utility worker 18 from falling to the ground should the utility worker 18 be ejected from the utility platform 20. The exterior anchor 64 is disposed on an exterior portion of the utility platform 20. In embodiments of the invention, the exterior anchor 64 is disposed to receive a platform strap (not illustrated) from the interior anchor 62 via the platform strap channel 60. The exterior anchor 64 of these embodiments acts as a failsafe in the event of a failure of the interior anchor 62. A secondary strap (not illustrated from the interior anchor 62 to the exterior anchor 64 is there if the platform disconnects from the aerial device. The utility worker 18 is attached via the lanyard 48 to the interior anchor 62, then via the secondary strap to exterior anchor 64, which is secured to the boom assembly 14 by another secondary strap. In other embodiments, the utility worker secures another lanyard to the exterior anchor 64. The exterior anchor 64 may be located in a position such that it is inaccessible to the utility worker 18 in the utility platform 20 so as to prevent the utility worker 18 from disconnecting their lanyard 48 while inside the utility platform 20. The exterior anchor is described in more detail in U.S. Pat. No. 8,899,380, entitled "SYSTEM FOR RESTRAINING A WORKER AT A UTILITY PLATFORM OF AN AERIAL DEVICE," issued Dec. 2, 2014, and incorporated by reference in its entirety.

The liner retention system 24 of the utility platform assembly 16 will now be discussed. The liner retention system 24 secures and protects the insulative liner 22 while it is in the utility platform 20. The liner retention system 24 generally comprises at least one retaining bar 66, a plurality of fastener receptors 68 disposed in each retaining bar 66, and a corresponding plurality of fasteners 70 for being secured into the fastener receptors 68 of the retaining bar 66. An exemplary liner retention system 24, as illustrated in FIGS. 3 and 4, comprises three retaining bars 66, each having at least one fastener receptor 68 and, in embodiments, a plurality of fastener receptors 68. In embodiments comprising the plurality of receptors 68, the receptors are intermittently spaced along the length of the retaining bar 66. Each of the plurality of fastener receptors 68 protrude from an engaging portion 72 of the retaining bar 66. A corresponding plurality of rectangular backing plates 74 may be disposed between each fastener 70 and the bucket sidewall 38. In the exemplary liner retention system 24 of FIGS. 3 and 4, only three of the four bucket sidewalls 38 are fitted with a retaining bar 66, so as to not interfere with the platform strap channel 60 and a set of upper controls 76. Additionally, the risk of damage to the insulative liner 22 is reduced on the side away from where the work will be performed. Other alternative embodiments are discussed below.

Figure 7:
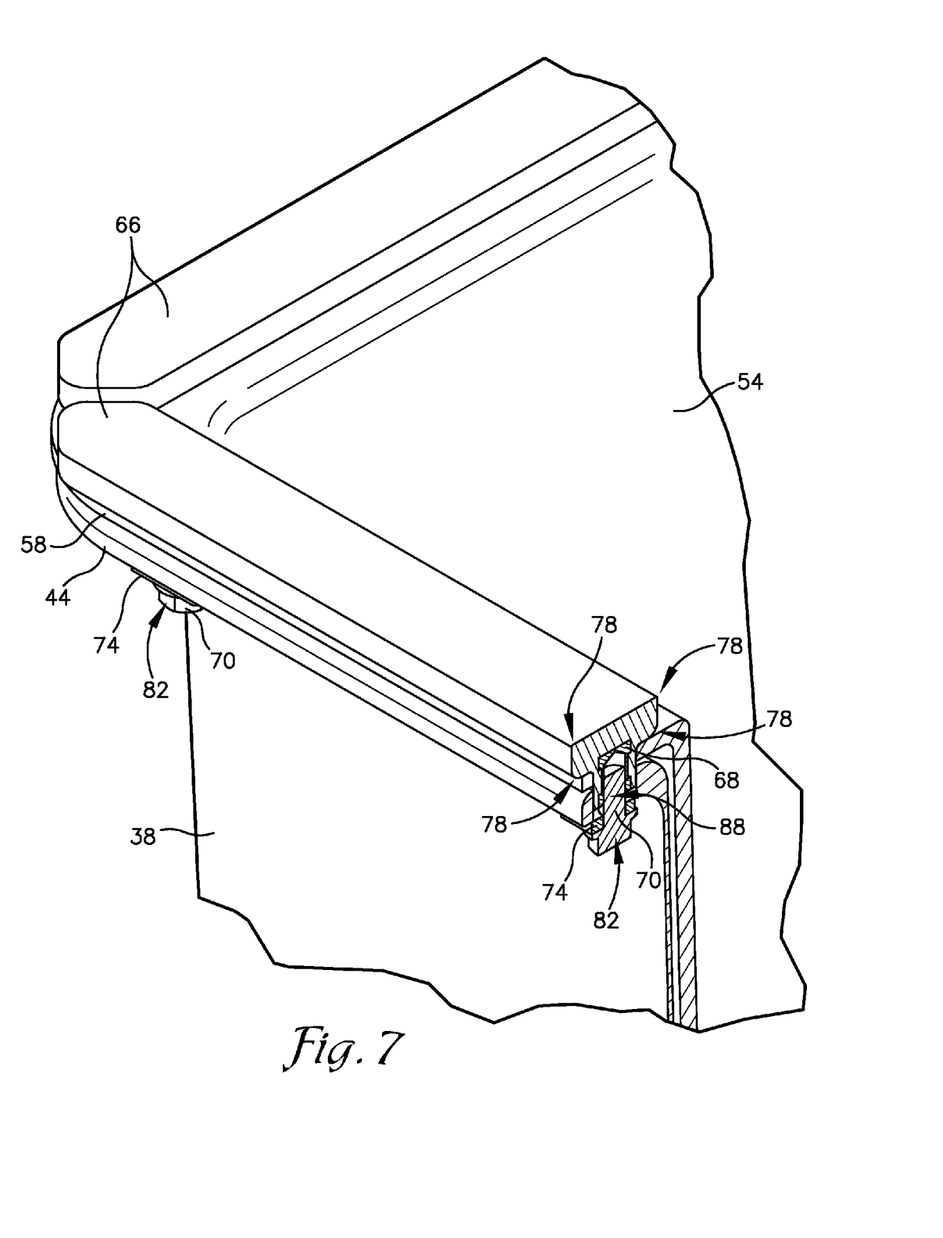
FIG. 7 is a perspective cross-sectional view of a liner retention system installed in the utility platform assembly.
Figure 8:
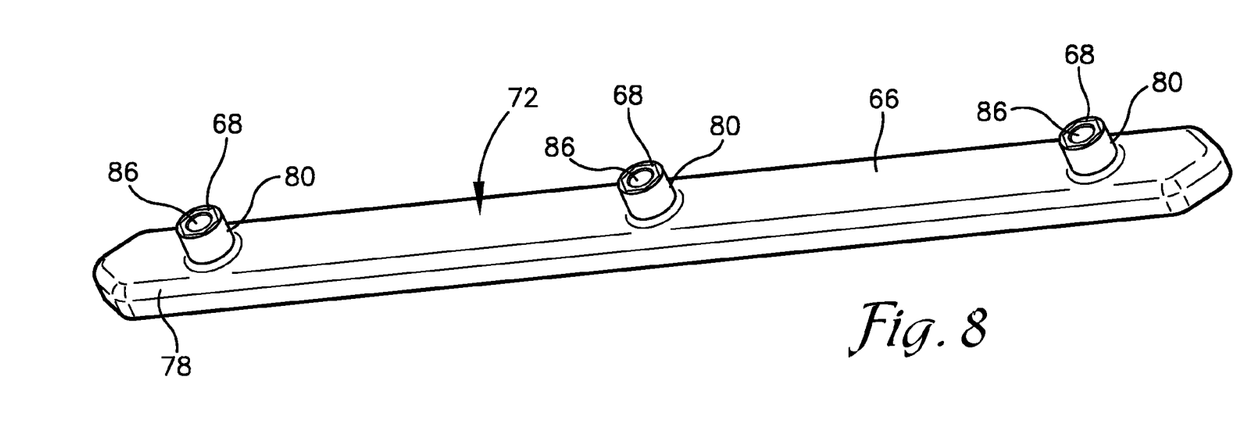
FIG. 8 is a perspective view of a retaining bar of the liner retention system.

The retaining bar 66 is an elongated member adapted to fit atop the lip of the insulative liner 22 and/or the bucket lip 44 of the bucket sidewall 38. In embodiments of the invention, as shown in FIGS. 7 and 8, the retaining bar 66 is substantially in contact with the insulative liner 22 on the engaging portion 72 of the retaining bar 66. The retaining bar 66 is disposed atop a substantial portion of the lip 44 of the insulative liner 22, as discussed below.

The retaining bar 66 is adapted to be secured and removed from the utility platform 20 and insulative liner 22 as desired by the utility worker 18. The retaining bar 66 is removable such that it may be quickly and easily replaced upon becoming worn or damaged. The bucket lip 44 of the utility platform 20 (to which the retaining bar 66 is secured) is subject to excessive wear and potential damage, for example, from the tools of the utility worker 18, from resting repair and replacement parts on the bucket lip 44, from the bucket lip 44 impacting stationary objects during movement, from the boots of ingressing and egressing utility workers, etc. The retaining bar 66 therefore reduces damage to the insulative liner 22 and the utility platform 20 and thereby reduces costly repairs and replacements.

In some embodiments, the retaining bars 66 are interchangeable. For example, as shown in FIGS. 3 and 4, all three retaining bars 66 may be of substantially the same size and shape. This allows an owner or operator to stock a single replacement part for worn or damaged retaining bars 66. In other embodiments there are a few standard sizes of retaining bars 66 such that the owner or operator need only stock a few replacement parts. In some embodiments, the standardized size or sizes of the retaining bars 66 are adapted to be added to existing utility platforms 20 and/or insulative liners 22, such as by drilling corresponding openings 52, 65 in the utility platform 20 and insulative liner 22 to match the fastener receptors 68 of the retaining bar 66.

Figure 9:
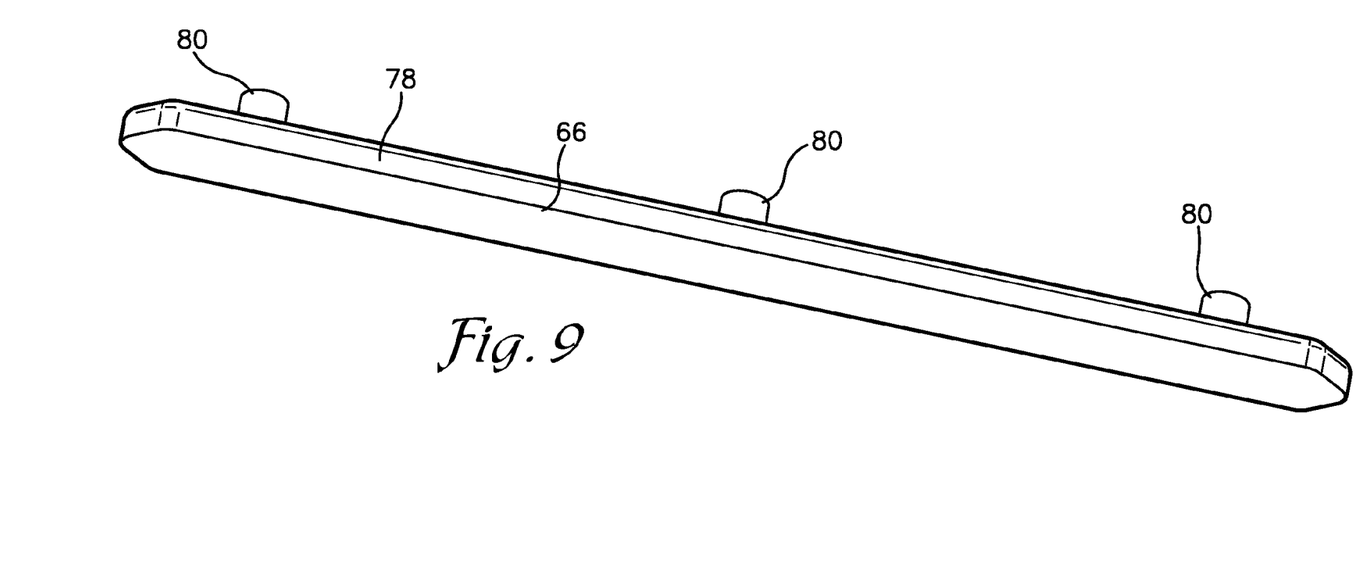
FIG. 9 is another perspective view of the retaining bar of FIG. 8.
Figure 10:
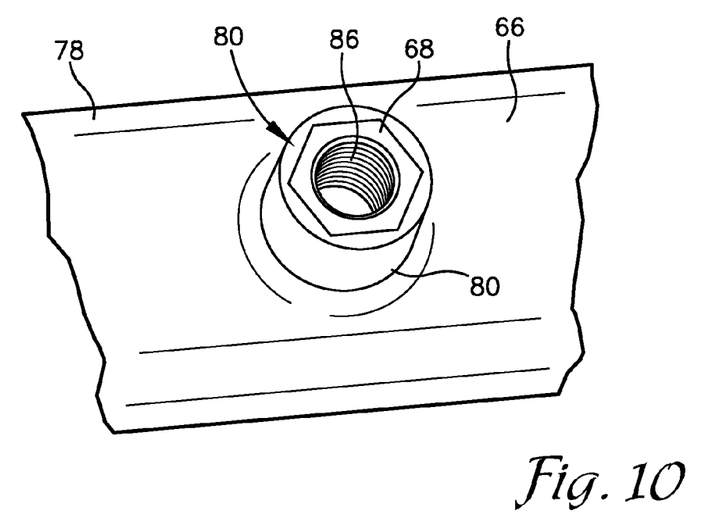
FIG. 10 is a perspective view of the retaining bar of FIG. 8, illustrating a cylindrical protrusion with a fastener receptor disposed therein.

Broadly, the retaining bar 66 presents an elongated shape. In embodiments, such as illustrated in FIGS. 8 and 9, the retaining bar 66 is elongated in a substantially straight line. In other embodiments, not illustrated, the retaining bar 66 may present a shape that is elongated but not substantially straight. For example, the retaining bar 66 may present an L-shape such that it is adapted to be secured around a corner between successive bucket sidewalls 38. As another example, the retaining bar 66 may present an arcuate shape to match an arcuate sidewall, as may be present on a D-shaped or elliptical utility platform.

The retaining bar 66 is of a length to reduce the damage to the insulative liner 22. As such the at least one retaining bar 66 of the liner retention system 24 may cover a substantial portion of a length of the edge of the insulative liner 22. As shown in FIGS. 3 and 4, each retaining bar 66 may cover a substantial portion of the bucket lip 44 of each sidewall. In embodiments of the invention, the retaining bar 66 presents a length that is substantially 100% of a length presented by the bucket lip 44, 90-99% of a length presented by the bucket lip 44, 80-90% of a length presented by the bucket lip 44, 70-80% of a length presented by the bucket lip 44, or greater than 50% of a length presented by the bucket lip 44. The retaining bar 66 may present a length of at least 24 inches, at least 32 inches, at least 36 inches, etc.

In embodiments of the invention, the retaining bar 66 has a width greater than the thickness to present a substantially flattened rectangular shape about a vertical cross-section. As illustrated in FIG. 7, the corners of the rectangular shape present a transition 78. The transition 78 may present an arcuate shape, a substantially right-angle shape, or a combination thereof. Angular and arcuate transitions 78 provide additional comfort for the utility worker 18, who is prone to rest their arms and hands on the retaining bar 66, and prevents damage by removing the right-angle corners that are prone to wear. In other embodiments, the retaining bar 66 presents another shape about the vertical cross-section, such as square, rhombus, ellipse, D-shape, etc. The retaining bar 66 may additionally, or in the alternative, be disposed along an outer edge of the bucket lip 44 and/or an inner edge of the bucket lip 44. In one embodiment, not illustrated, the retaining bar 66 presents an upside-down U-shape, such that it covers the inner edge of the bucket lip 44, the bucket lip 44, and the outer edge of the bucket lip 44.

The retaining bar 66 therefore presents a thickness, a width, and a cross-sectional area. The thickness of the retaining bar 66 is sufficient to protect the insulative liner 22 from damage by absorbing at least a portion of the energy imparted by impacts (such as those discussed above). The thickness of the retaining bar 66 is measured as the distance from the engaging portion 72 of the retaining bar 66 to a side or position opposite the engaging portion. The thickness of the retaining bar 66 may be at least one inch, at least two inches, at least three inches, etc. The thickness of the retaining bar 66 may also be twice the thickness of the insulative liner 22, three times the thickness of the insulative liner 22, etc.

The width of the retaining bar 66 is sufficient to protect all, or a significant portion, of the bucket lip 44. As illustrated in FIG. 7, the retaining bar 66 may present a width approximately equal to a width presented by the bucket lip 44. In other embodiments, the retaining bar 66 presents a width that is 100-120% the width of the bucket lip 44, 100-150% the width of the bucket lip 44, 80-100% the width of the bucket lip 44, 80-120% the width of the bucket lip 44, etc. The width of the retaining bar 66 may be at least 2 inches, at least 4 inches, at least 6 inches, etc. As discussed above, some embodiments of the retaining bar 66 may additionally cover an inner edge or an outer edge of the bucket lip 44. In still other embodiments, there is no lip on the bucket sidewalls 38 of the utility platform 20. In these embodiments, the width of the retaining bar 66 may traverse a top portion of the bucket sidewall 38.

The cross-sectional area of the retaining bar 66 is therefore indicative of the amount of protection provided by the retaining bar 66. In retaining bars 66 that present a generally flattened rectangular shape about the vertical cross-section, as discussed above, the cross-sectional area may be approximated as the product of the thickness and the width. In embodiments of the invention, the ratio of thickness to width may be 1:1.5, 1:2, 1:3, 1:4, etc. It should be appreciated, though, that other aspect ratios could be used in other embodiments of the invention. It should also be noted that the cross-sectional area might be greater near cylindrical protrusions of the fastener receptors 68, discussed below.

The retaining bar 66 is formed of a non-conductive material. As discussed above, embodiments of the invention are utilized in an aerial device 10 that has an electrically insulated and isolated utility platform 20. The insulative liner 22 provides additional insulation and an insulative liner 22 between the interior anchor 62 (often formed of a metal) and the utility worker 18. The retaining bar 66 therefore is also formed of a non-conductive material so as to not create an unsafe working environment in the utility platform 20.

In embodiments of the invention, the retaining bar 66 is formed of a cast urethane. In other embodiments, the retaining bar 66 is formed of another hardened polymer, such as a polyurethane, plastic, ISOPLAST, etc. The material from which the retaining bar 66 is formed provides impact strength and resistance to compressive and shearing stresses. The material from which the retaining bar 66 is formed also provides electrical resistance or insulation.

In some embodiments of the invention the retaining bar 66 includes metallic fastener receptors 68. As further discussed below, some components of the retaining bar 66, such as the fastener receptors 68, may be formed of a metal that is no longer exposed upon installation. Other examples of internal metallic parts could include a metallic reinforcing bar disposed fully internally to the retaining bar 66 for additional strength and protection.

In embodiments of the invention, three retaining bars 66 are utilized in the liner retention system 24. In these embodiments, the fourth sidewall of the liner and utility platform 20 is located adjacent to the set of upper controls 76, as illustrated in FIG. 3. In these embodiments, the set of controls is located on the same side as an attachment point of the boom assembly 14. Typically, the utility worker 18 will perform work on a side other than the side on which the set of controls is located. Accordingly, the side on which the set of controls is located is susceptible to less stress and impact than the other three sides. Also, the retaining bar 66 may not fit onto the fourth side due to the presence of the set of boom controls and the platform strap channel 60. In other embodiments, a retaining bar 66 substantially covers each of the bucket sidewalls 38 and liner sidewalls 54. In still other embodiments, instead of utilizing three retaining bars (each having a substantially elongated straight shape), a single retaining bar that presents a substantial U-shape is utilized to provide protection to the three sidewalls.

The fastening of the liner retention system 24 to the utility platform 20 and insulative liner 22 will now be discussed. In embodiments of the invention, a set of fastener receptors 68 are disposed in a set of protrusions 80 of the retaining bar 66. Each of the set of protrusions 80 traverses the set of openings 65 in the insulative liner 22 and the set of openings 52 in the utility platform 20. The fastener 70, having a head 82 larger than said openings 52, 65, is then secured within each fastener receptor 68 to secure the retaining bar 66. Optionally, a backing plate 74 may be emplaced between the head 82 of each fastener 70 and the end of each protrusion 80 to provide additional support. In other embodiments, there is no set of protrusions of the retaining bar 66 and the fastener receptors 68 traverse the openings 52, 65.

In embodiments of the invention, each of the fastener receptors 68 is disposed at least in part within each of the set of protrusions 80 rising from the engaging portion 72 of the retaining bar 66. The set of protrusions 80 traverse an opening 65 in the insulative liner 22 and a corresponding opening 52 in the utility platform 20. The set of protrusions 80 therefore present a dimension or dimensions that are substantially similar to, or slightly smaller than, a dimension or dimensions presented by the corresponding openings 52, 65 in the utility platform 20 and insulative liner 22. Said dimension or dimensions are based upon a horizontal cross-sectional shape. In some embodiments, such as illustrated in FIG. 8, the cross-sectional shape of the set of protrusions 80 is a circle. The use of a circle-shaped (i.e. cylindrical) protrusion 80 allows for existing utility platforms 20 and/or insulative liners 22 to be retrofitted with the openings 52, 65 by drilling a hole. The height presented by the protrusion 80 is the substantially the same as, or slightly shorter than, the combined thickness of the insulative liner 22 and the bucket lip 44 of the utility platform 20. An exemplary protrusion 80 presents a cylindrical shape. The height of the cylinder may be at least one half inch, at least one inch, at least two inches, etc. The diameter of the cylinder may be at least one half inch, at least one inch, at least two inches, etc. Additionally, the ratio of the diameter of the cylinder to the diameter of the fastener 70 may be at least 1.5:1, at least 2:1, or at least 2.5:1.

In other embodiments, not illustrated, such as those in which the utility platform assembly 16 is originally manufactured together, the set of protrusions 80 may present another shape such as a rectangular prism, a hexagonal prism, an octagonal prism, etc. In still other embodiments, not illustrated, the set of protrusions 80 includes more than one shape to ensure the retaining bar 66 is installed in the proper orientation and/or on the proper side. In some embodiments, these openings 52 are originally manufactured with the utility platform 20. In other embodiments, the openings 52, 65 are subsequently added to the insulative liner 22 and/or the utility platform 20.

The set of protrusions 80 is typically formed of the same material, and is monolithic with, the retaining bar 66. Embodiments of the set of protrusions 80 are originally cast with the fastener receptors 68 therein. In other embodiments, the set of protrusions 80 is manufactured with a depression or void into which the fastener receptors 68 are emplaced. Due to the hardened nature of the retaining bar 66 (discussed above), the fastener receptors 68 may have to be hammered, pressed, or otherwise machined into the set of protrusions 80.

The fastener receptors 68 are typically formed of a metal. Forming the fastener receptors 68 of metal provides additional support and strength. The fastener receptors 68 are disposed within the set of protrusions 80 such that the metal is not exposed except along a bottom edge (that is later covered with a non-conductive bolt and/or non-conductive backing plate 74, as discussed below) to reduce the likelihood of electrical discharge. In other embodiments, the fastener receptors 68 may be formed of a hardened polymer and may be monolithic with the protrusions 80.

The fastener receptor 68 is a hardened member adapted to receive the fastener. The fastener receptor 68 provides strength to resist the sheering and compressive stresses imparted on the set of protrusions 80. The fastener receptor 68 therefore provide an advantage over the prior art, in which the non-conductive (i.e. non-metallic) bolts traversed the openings 52, 65 in the utility platform 20 and the insulative liner 22. Stresses and impacts placed on the utility platform 20 and insulative liner 22 caused failures on the non-conductive bolts. The protrusions 80, having the fastener receptors 68 disposed therein, provide improved strength for resisting this stresses and impacts. The liner retention system 24 therefore provides many of the benefits of utilizing a metallic fastener 70 while ensuring no exposed conductive elements and easy removal for repair or replacement.

The fastener receptor 68 presents an elongated body 84 with a void 86 to receive the inserted fastener 70. In embodiments of the invention, the void 86 presents a threaded, cylindrical shape so as to receive a threaded fastener 70, such as a bolt or a machine screw. In other embodiments, not illustrated, the void 86 may present another shape so as to receive a fastener 70 that is a clip, a rivet, a wedge, or other type of fastener.

In other embodiments of the invention, not illustrated, the fastener receptors 68 are secured to the insulative liner 22. In these embodiments, the fastener 70 is emplaced downward into an opening of the retaining bar 66 to engage the fastener receptor 68 that is secured to the insulative liner 22. In yet other embodiments of the invention, not illustrated, the fastener receptors 68 are secured to the utility platform 20. In these embodiments, the fastener 70 is emplaced downward into an opening of the retaining bar 66 and through a corresponding opening in the insulative liner 22 to engage the fastener receptor 68. In yet further embodiments, the retaining bar presents a substantial C-shape about a vertical cross section. In these embodiments, the C-shape fits complementary to the bucket lip 44 of the utility platform 20 and the liner lip 58 of the insulative liner 22. The fastener traverses an opening in an upper portion of the retaining bar 66, the openings 52, 65 in the utility platform and in the insulative liner, and secured to the fastener receptor 68 disposed in a lower portion of the retaining bar 66.

In embodiments of the invention, the fastener 70 presents a head 82 and a substantially cylindrical body 88 with a threaded portion for screwing into the fastener receptor 68. Embodiments of the fasteners 70 are formed of ISOPLAST or another hardened polymer. The ISOPLAST is a non-conductive, hardened material composed of glass and other polymers. Because the fastener 70 is exposed, and may occasionally come into contact with electrified surfaces, the fastener 70 is non-conductive. In other embodiments, not illustrated, the fastener 70 may be formed of a metal and then have a covering placed over the fastener 70. Utilizing the metallic fastener receptor 68 and the non-conductive ISOPLAST bolt provides the strength to withstand the forces applied to the liner retention system 24 while presenting no conductive material and being quickly removable.

Figure 11:
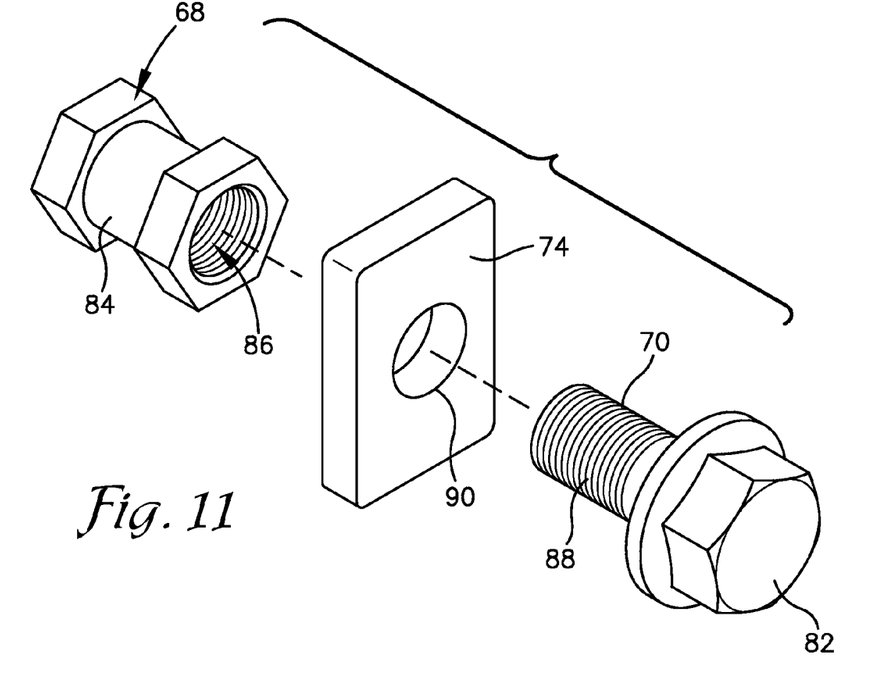
FIG. 11 is a perspective view illustrating exemplary fastening components of the liner retention system, namely a fastener receptor, a fastener, and a backing plate.

In some embodiments, a backing plate 74 is disposed between the head 82 of each fastener 70 and the utility platform 20, as illustrated in FIGS. 7 and 11. The backing plate 74 is formed of a non-conductive substance, such as ISOPLAST, polyethylene, or another polymer. The backing plate 74 increases the surface area over which the head 82 of the fastener 70 contacts the utility platform 20. As discussed above, the head 82 of the non-conductive fastener 70 is prone to failure due to stresses. The backing plate 74 therefore distributes these stresses over a larger area and absorbs a portion of the stresses. The backing plate 74 also ensures that the metallic fastener receptor 68 is not exposed by providing an even larger covering over the exposed portion than the fastener 70 does. As illustrated in FIG. 11, the backing plate 74 presents a generally rectangular shape with an opening 90 therein. The opening 90 approximates or is slightly larger than the diameter of the cylindrical shape of the fastener 70. The backing plate 74 presents overall dimensions that are larger than the head 82 of the fastener 70, so as to distribute stresses.

In embodiments of the invention, the backing plate 74 is not intended to contact the fastener receptor 68 or the protrusion 80. The backing plate 74 covers the bottom of the opening 52 in the utility platform 20. There may be a gap between the backing plate 74 and the protrusion 80 so that the fastener 70 and the protrusion 80 can both stretch to accommodate elasticity.

Various methods of the invention will now be discussed. A method of installing the liner retention system 24 comprises the following steps: inserting a plurality of cylindrical protrusions 80 of at least one retaining bar 66 through a corresponding plurality of openings 52 in the insulative liner 22 and through a corresponding plurality of openings 65 in the insulative liner 22, wherein there is a fastener receptor 68 disposed in each of said plurality of cylindrical protrusions 80; placing a backing plate 74 against each fastener receptor 68 disposed in each cylindrical protrusion 80; inserting a fastener 70 into each fastener receptor 68; securing each fastener 70 to the fastener receptor 68, such that the retaining bar 66 is secured to the insulative liner 22. In some embodiments the method further comprises steps such as drilling a hole into the bucket lip 44 of the utility platform 20; and drilling a hole into the bucket lip 44 of the insulative liner 22.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A utility platform assembly for use with an aerial device, the utility platform assembly comprising:
    a utility platform having a cavity therein that is adapted for providing an elevated work surface for a utility worker,
    said utility platform including a bucket floor and at least one bucket sidewall;
    an insulative liner having a shape complementary to at least a portion of the cavity of the utility platform,
    said insulative liner being disposed in at least a portion of the cavity of the utility platform,
    said insulative liner including a top upper edge that presents an opening shape;
    a liner retention system for securing the insulative liner to the utility platform, the liner retention system including—
        at least one retaining bar being an elongated member having a shape complementary to at least a portion of said opening shape of the insulative liner,
    wherein said at least one retaining bar includes an engaging portion for placing against at least a portion of the top upper edge of the insulative liner,
    wherein said at least one retaining bar includes a plurality of cylindrical protrusions on said engaging portion;
    a plurality of fastener receptors disposed in each retaining bar;
    a plurality of fasteners adapted to be secured to the fastener receptors,
    wherein each fastener receptor traverses an opening in the insulative liner and a corresponding opening in the utility platform,
    wherein each of the plurality of cylindrical protrusions is adapted to traverse the opening in the insulative liner and the corresponding opening in the utility platform.

2. The utility platform of claim 1,
    wherein each fastener receptor is at least partially disposed in one of said plurality of cylindrical protrusions.

3. The utility platform of claim 1,
    wherein the utility platform presents a bucket lip and the insulative liner presents a liner lip,
    wherein the at least one retaining bar is disposed atop the liner lip and the bucket lip.

4. The utility platform of claim 1, wherein the at least one retaining bar is formed of a polymer.

5. The utility platform of claim 4,
    wherein the fastener receptors include a threaded portion on an interior segment that is formed of a metal,
    wherein the fastener is formed of a polymer, such that upon installation of the fastener into the fastener receptor there is no exposed metal.

6. The utility platform of claim 5, further comprising a plurality of backing plates, each said backing plate being disposed between a head of the fastener and the utility platform.

7. The utility platform of claim 5, wherein the fastener receptor is cast into the retaining bar.

8. The utility platform of claim 1,
    wherein the utility platform presents a generally rectangular shape about a horizontal cross-section,
    wherein said at least one bucket sidewall of the utility platform includes a first sidewall, a second sidewall, a third sidewall, and a fourth sidewall,
    wherein said opening shape of the insulative liner is a generally rectangular shape.

9. The utility platform of claim 8,
    wherein the shape presented by the at least one retaining bar is a substantially straight elongated member that presents a flattened rectangular shape about a vertical cross-section.

10. The utility platform of claim 9,
    wherein the at least one retaining bar includes a first retaining bar, a second retaining bar, and a third retaining bar,
    wherein the insulative liner is secured on three of the four sidewalls of said rectangular shape of the opening shape.

* * * * *